(12) United States Patent
Redjdal et al.

(10) Patent No.: US 9,242,224 B2
(45) Date of Patent: *Jan. 26, 2016

(54) METHOD FOR THE PRODUCTION OF MULTIPHASE COMPOSITE MATERIALS USING MICROWAVE PLASMA PROCESS

(71) Applicant: AMASTAN TECHNOLOGIES LLC, North Andover, MA (US)

(72) Inventors: Makhlouf Redjdal, Storrs-Mansfield, CT (US); Kamal Hadidi, Somerville, MA (US)

(73) Assignee: AMASTAN TECHNOLOGIES LLC, North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/208,955

(22) Filed: Mar. 13, 2014

(65) Prior Publication Data

US 2014/0217630 A1    Aug. 7, 2014

Related U.S. Application Data

(63) Continuation-in-part of application No. 13/693,737, filed on Dec. 4, 2012, now Pat. No. 8,951,496.

(60) Provisional application No. 61/802,769, filed on Mar. 18, 2013.

(51) Int. Cl.

| | |
|---|---|
| *B01J 19/00* | (2006.01) |
| *B01J 19/12* | (2006.01) |
| *C04B 35/44* | (2006.01) |
| *C04B 35/443* | (2006.01) |
| *C04B 35/626* | (2006.01) |
| *C04B 35/645* | (2006.01) |
| *C01B 13/34* | (2006.01) |
| *C01F 7/16* | (2006.01) |
| *C01F 17/00* | (2006.01) |

(52) U.S. Cl.
CPC ............. *B01J 19/126* (2013.01); *C01B 13/34* (2013.01); *C01F 7/162* (2013.01); *C01F 17/0025* (2013.01); *C04B 35/44* (2013.01); *C04B 35/443* (2013.01); *C04B 35/6263* (2013.01); *C04B 35/62665* (2013.01); *C04B 35/645* (2013.01); *C04B 35/6455* (2013.01); *C01P 2002/02* (2013.01); *C01P 2002/72* (2013.01); *C01P 2004/03* (2013.01); *C01P 2004/32* (2013.01); *C01P 2004/61* (2013.01); *C04B 2235/3222* (2013.01); *C04B 2235/3224* (2013.01); *C04B 2235/3225* (2013.01); *C04B 2235/528* (2013.01); *C04B 2235/764* (2013.01)

(58) Field of Classification Search
None
See application file for complete search history.

(56) References Cited

U.S. PATENT DOCUMENTS

| | | |
|---|---|---|
| 6,274,110 B1 | 8/2001 | Kim |
| 6,543,380 B1 | 4/2003 | Sung-Spitzl |
| 6,652,822 B2 | 11/2003 | Phillips |
| 6,902,745 B2 | 6/2005 | Lee |
| 6,919,527 B2 | 7/2005 | Boulos |
| 7,220,398 B2 | 5/2007 | Sutorik |
| 7,357,910 B2 | 4/2008 | Phillips |
| 7,629,553 B2 * | 12/2009 | Fanson et al. ............ 219/121.59 |
| 7,700,152 B2 | 4/2010 | Laine |
| 8,211,388 B2 | 7/2012 | Woodfield |
| 8,268,230 B2 | 9/2012 | Cherepy |
| 8,329,090 B2 | 12/2012 | Hollingsworth |
| 2008/0173641 A1 * | 7/2008 | Hadidi et al. ................ 219/690 |
| 2010/0200808 A1 * | 8/2010 | Hafiz et al. ............... 252/301.36 |
| 2012/0322645 A1 | 12/2012 | Jordan |

OTHER PUBLICATIONS

Boulos M I. The inductively coupled radio frequency plasma. Journal of high temperature material process, vol. I, pp. 17-39 (1997).
Veith et al.. Low temperature synthesis of nanocrystalline Y3Al5O12 (YAG) and Ce-doped Y3Al5O12 via different sol-gel methods. J Mater Chem, 9, 3069-3079 (1999).
Muoto C K, JordanE H, Gell M and Aindow M.. Phase Homogeneity in Y2O3—MgO Nanocomposites Synthesized by Thermal Decomposio J. Am. Ceram. Soc., 94 p. 4207-4217 (2011).
Lain R M et al. Making nanosized oxide powders from precursors by flame spray pyrolysis. Key Engineering Materials, v 159-160, p. 17-24, (1999).

* cited by examiner

*Primary Examiner* — Steven Bos
(74) *Attorney, Agent, or Firm* — McCarter & English, LLP; Deborah M. Vernon

(57) ABSTRACT

Disclosed herein is a method to produce multiphase composite materials directly from solution precursor droplets by a fast pyrolysis process using a microwave plasma embodiment containing a microwave generating source, a dielectric plasma torch, and a droplet maker. Here, using homogenous solution precursors, droplets are generated with a narrow size distribution, and are injected and introduced into the microwave plasma torch with generally uniform thermal path. The generally uniform thermal path in the torch is achieved by axial injection of droplets into an axisymmetric hot zone with laminar flows. Upon exposing to high temperature within the plasma with controlled residence time, the droplets are pyrolyzed and converted into particles by quenching with a controlled rate of the exhaust gas in a gas chamber. The particles generated have generally uniform sizes and uniform thermal history, and can be used for a variety of applications.

18 Claims, 9 Drawing Sheets

METHOD FOR THE PRODUCTION OF MULTIPHASE COMPOSITE MATERIALS USING MICROWAVE PLASMA PROCESS

CROSS-REFERENCE TO RELATED APPLICATIONS

This application is a continuation-in-part application of application Ser. No. 13/693,737, filed on Dec. 4, 2012, by inventors Kamal Hadidi and Makhlouf Redjdal, with title of "Method for Making Amorphous Particles Using a Uniform Melt-state in a Microwave Generated Plasma Torch," which is incorporated herein by reference in its entirety. This application also claims priority to U.S. Provisional Application No. 61/802,769, filed on Mar. 18, 2013, by inventors Makhlouf Redjdal and Kamal Hadidi, with title of "Single-Step Synthesis Method for the Production of Multiphase Oxide Ceramics Using Microwave Plasma Process," which is also incorporated herein by reference in its entirety.

BACKGROUND OF THE INVENTION

The present invention is generally directed to a method for making multiphase composite materials directly from solution precursor droplets by a fast pyrolysis process using microwave generated plasma.

In recent years, the advent of multiphase nanostructure composites of metal oxide ceramics has undergone a leap in interest as a natural improvement of coarse grain or even single phase nanostructures of these materials. It was found that mechanical, thermal, optical, chemical, electrical and magnetic material properties can be drastically improved as the grain size is reduced from the coarse scale in micrometers to a nanometer scale, typically with grain size below 100 nanometers (nm). Furthermore, these nanocomposite materials exhibit a much stable phase than their counterpart, single phase materials. The presence of several phases in one matrix tends to inhibit grain growth during thermal heating. The properties of these new materials are also influenced by the nanoscale grain boundaries prone to site pinning and responsible for phase micro structure stability. Another stringent condition to achieve phase stability is the production of these multiphase nanocomposites with a fine and uniform distribution of phase domains in the nanocomposite matrix.

Many synthetic methods have been used to synthesize these nanocomposite materials to control micro structure length scales and the distribution of the elements in the composition. Most methods are unable to achieve both conditions due to the complexity of chemical, thermal, and nucleation rates of the matrix components, with the added difficulty of the physical and chemical properties of the solvents involved. Some can achieve both but they require the use of several thermal processing steps to achieve nanoscale grains and phase homogeneity of the constituents matrix. Jordan et al. (US Patent Application # US20120322645, 2012) used a sol-gel esterification technique to produce magnesia-yttrium particles suitable for infra-red window application. This invention uses three main steps: step 1 consists of moderate heating at low temperature to evaporate water and form a foam consisting of the complexion network of organic acid and alcohol necessary to achieve the homogenous dispersion of metal oxide cations; step 2 consists of thermal heating up to 400° C. to eliminate all carbon embedded in the foam while keeping grain size below 20 nanometers (nm); step 3 uses thermal treatment up to 1100° C. to achieve full crystallinity of the magnesia-yttrium nanocomposite with grain size about 100 nm. Major drawbacks of such approach include the fact that it is not easily scalable, as it will require large furnaces, and requires hours, if not days, of thermal heating to eliminate the solvents, and also achieve full crystallization of the final product.

A method that achieves ultrafine and somewhat homogenous metal oxide nanocomposites is Liquid-Feed-Flame-Pyrolysis by R. Laine et al. (U.S. Pat. No. 7,700,152, 2010). This method injects atomized droplets of metal precursors into a combustion flame to produce nanocomposite particles powders in few milliseconds, similar to the present invention. However, this method suffers from some drawbacks including non-uniform size and size distribution of particles due to atomization, and non homogenous thermal heating of droplets due to large temperature gradient across the flame whose temperature does not exceed 2000° C. This results in non-homogeneity of phase micro structure of composition distribution in the final product. Post processing steps involving cyclones and ceramic filters are required to separate large agglomerates from nanoscale particles.

Another method that features the 1-step approach for the production of nanocomposite materials uses radio frequency plasma to process atomized droplets of metal precursors (Boulos, U.S. Pat. No. 6,919,527 B2, 2005). Although high temperature and axisymmetry of physical embodiment to contain the plasma are achieved, this method still suffers from non uniformity of composition due to, in part, injection of atomized liquid precursors of variable sizes, but also to the non uniformity of the plasma which exhibits a hollow core due to skin effect. Particles passing through the core of the plasma tend not to be fully processed compared to the particles passing through the peripheral part of the plasma. This leads to non homogeneity of particle processing and production of particles with homogeneous phase microstructure.

From the above, it is therefore seen that there exists a need in the art to overcome the deficiencies and limitations described herein and above.

SUMMARY OF THE INVENTION

The shortcomings of the prior art are overcome and additional advantages are provided through making multiphase composite materials directly from solution precursor droplets by a fast pyrolysis process using microwave generated plasma. This process solves two major issues that had plagued the materials thermal processing industry that are compositional non uniformity of feedstock and non uniform thermal paths. Here, using homogenous solution precursors, droplets are generated with a narrow size distribution, and are injected and introduced into the microwave plasma torch with generally uniform thermal path. The generally uniform thermal path in the torch is achieved by axial injection of droplets into an axisymmetric hot zone with laminar flows.

In one aspect, multiphase composite materials were produced by first preparing a salt solution in water, in organic solvent, or in a mixture of water and organic solvent, followed by generating precursor droplets from this salt solution using a feed injection device; the droplets were then introduced axially into a microwave plasma torch using gas flows towards a microwave generated plasma; upon exposing to high temperature within the plasma with controlled residence time, the droplets were pyrolyzed and converted into particles by quenching with a controlled rate of the exhaust gas in a gas chamber; finally, the particles were filtered and extracted from the exhaust gas.

The salt solution was generated in accordance with a different method. In one example, the salt solution was prepared by further including an acid in the solution. In another example, a salt solution was prepared by combining a solution of a) water and organic solvent (e.g. water and ethylene glycol), b) water and acid (e.g. water and citric acid), or c) water, organic solvent, and acid (e.g. water, ethylene glycol, and citric acid), with another solution of a) water and salt, or b) water, salt, and organic solvent. The organic solvent was selected from solvents that are miscible with water, for example, ethanol, methanol, 1-propanol, 2-propanol, tetrahydrofuran, or a mixture of those solvents.

In another aspect, the compositions of the resulting particles are adjusted by selecting salts with different cations. The cations are chosen from elements of alkali metals, alkaline earth metals, transition metals, post transition metals, lanthanides, actinides, metalloids, nonmetals, and a mixture of those elements.

For example, to produce yttrium (and/or scandium)-aluminum-garnet product particles, cations of the salt solution are aluminum, yttrium (and/or scandium), and other dopant such as lanthanum, cerium, praseodymium, neodymium, promethium, samarium, europium, gadolinium, terbium, dysprosium, holmium, erbium, thulium, ytterbium, lutetium, and their combinations. The product particles can be used as active material for lasers or phosphors and other applications.

Other examples of cations are selected from a.) post transition metal and transition metal mixtures, b.) magnesium and yttrium, c.) magnesium and aluminum, d.) lanthanum, magnesium, and aluminium, e.) zirconium, and yttrium (and/or samarium). The product particles from these selections are used as active materials for different applications, such as, catalysts, infrared transmitting material, transparent armor, thermal barrier coating, and solid oxide fuel cells.

In another aspect, the anions of the salt are chosen from nitrate, acetate, citrate, sulfate, carbonate, chloride, phosphate, alkoxide, atrane, tetraethyl orthosilicate, metallic borohydride, and a mixture of these anions.

In another aspect, the salt solution droplets are entrained using at least two concentric laminar flows, and such laminar flows are generated using gases of air, oxygen, argon, methane, ammonia, nitrogen, and any combination of these gases.

In another aspect, the exhaust gas from the microwave plasma is quenched by selecting quenching rate no less than 103 Kelvin per second (K/s) to no more than 106 K/s, and the quenching is achieved by using a chamber with controllable atmosphere.

Accordingly, it is an object of the present invention to generate particles with generally uniform size and uniform thermal history for a variety of applications.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

Disclosed herein is a method to produce multiphase composite materials directly from solution precursor droplets by a fast pyrolysis process using a microwave plasma embodiment containing a microwave generating source as described in patent application # US 2008/0173641, a dielectric plasma torch described in a patent application elsewhere, and droplet maker dispensing uniform precursor droplet described in a patent elsewhere. Here, using homogenous solution precursors, droplets are generated with a narrow size distribution, and are injected and introduced into the microwave plasma torch with generally uniform thermal path. The generally uniform thermal path in the torch is achieved by axial injection of droplets into an axisymmetric hot zone with laminar flows. Upon exposing to high temperature within the plasma with controlled residence time, the droplets are pyrolyzed and converted into particles by quenching with a controlled rate of the exhaust gas in a gas chamber. The particles generated have generally uniform sizes and uniform thermal history, and can be used for a variety of applications.

Figure 1:
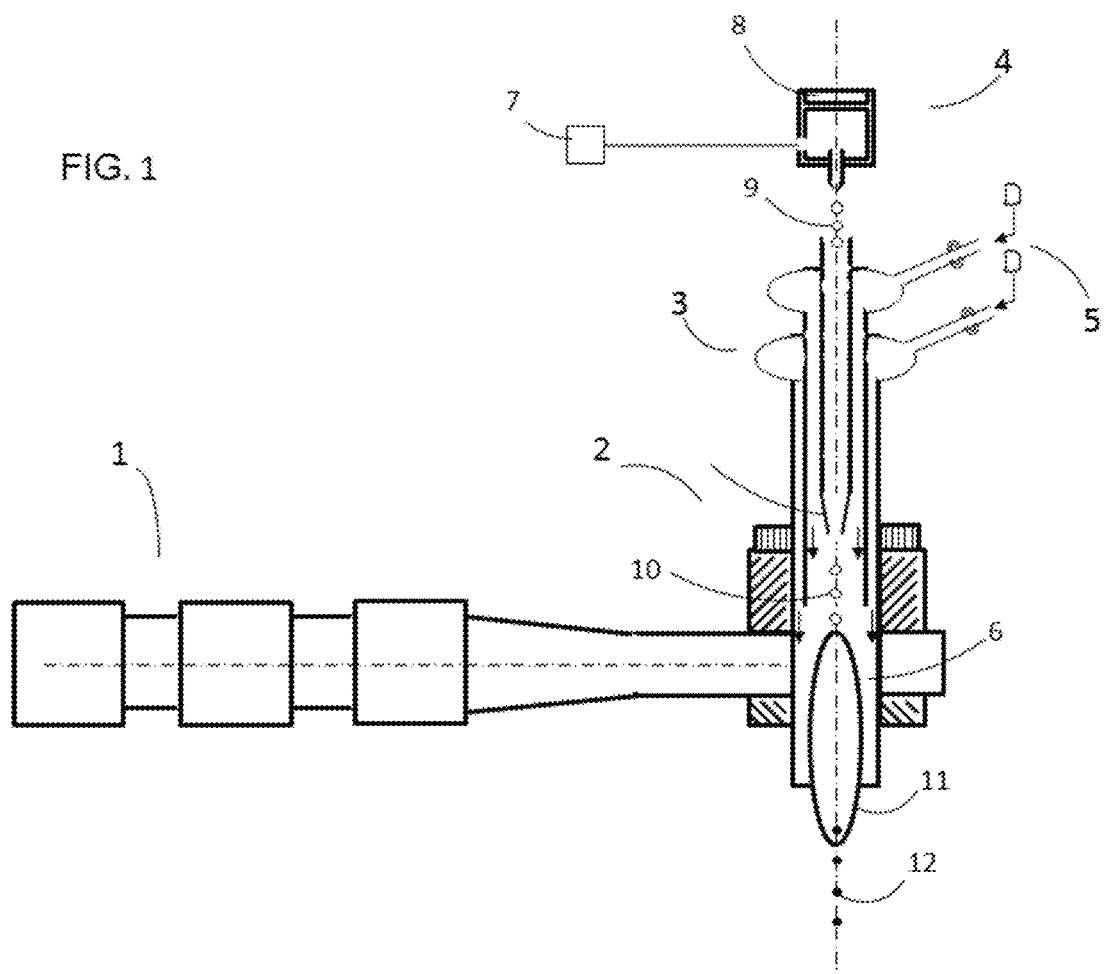
FIG. 1 illustrates the method of making particles using a microwave plasma embodiment containing a microwave generating source as described in Patent application # US 2008/0173641, a dielectric plasma torch, and droplet maker dispensing precursor droplet.

Referring to FIG. 1, this method for making metal oxide nanocomposite ceramics consists of an apparatus that includes a microwave radiation generator 1, a plasma chamber 2, a dielectric sheathing plasma torch 3, a droplet maker 4, and a gas flow communication scheme 5. The microwave generator 1 is combined with plasma chamber 2 and dielectric plasma torch sheathing 3 to ignite stable plasma in hot zone 6 inside dielectric torch 3. A homogenous solution of metal salts and solvents, under constant stirring and pressure in tank 7, is injected into the droplet maker 4. A piezo-electric element 8 is activated to produce uniform droplets 9 which are axially injected into plasma torch 3, and entrained as particles 10 by laminar gas flows due to gas flow communication scheme 5. In hot zone 6 with stable and contained plasma 11, particles 10 undergo homogeneous thermal treatment to become spherical product particles 11 collected in stainless steel or ceramic filters.

Figure 2:
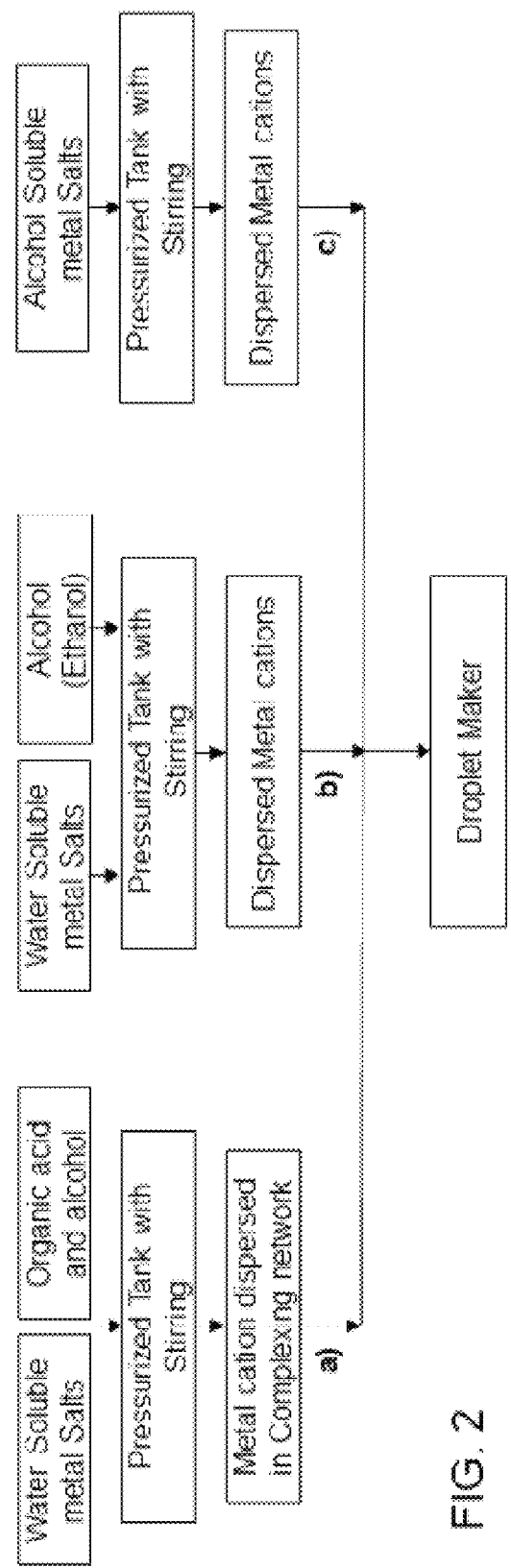
FIG. 2 illustrates the schematic diagram of several routes used to prepare the salt solution for generating precursor droplets.

Referring to FIG. 2, a schematic on how to prepare the metal precursors is described. High level precursor homogeneity depends on molecular species, their high miscibility of liquid phases, and their low melting points. Other factors affecting final morphology and micro structure homogeneity include molar concentration, solvent evaporation rate, solute diffusion, and associated thermal kinetics involved during thermal processing. The present invention uses three routes for precursor preparation. Route 1 (FIG. 2a) involves an organic acid, for instance citric acid, and an organic alcohol, for instance ethylene glycol, to produce a complexion network for an optimum dispersion of solutes in solution. This route has been used to produce porous particles of $MgO$—$Y_2O_3$, shells of $MgAl_2O_4$ (Spinel), and $Y_3Al_5O_{12}$ (YAG) oxide nanocomposites. Route 2 (FIG. 2b) involves an alcohol, such as ethanol, methanol, or propanol, mixed with high molar concentration of water soluble metal salts. This method was used to produce solid particles of MgO. Finally, route 3 (FIG. 2c) involves using more expensive precursors using alkoxides diluted in alcohol to provide the metal source to produce metal oxide ceramics. This method was used to produce particles of $LaMgAl_{11}O_{19}$. All three mixtures are thoroughly stirred in a pressurized tank to produce homogenous solution precursors.

Disclosed herein are compositions of metal oxide ceramics suitable for laser, phosphor, catalytic, armor, and visible-to-infrared windows applications. Some compositions are based on, for instance, stoichiometric ratios of binary, ternary systems of aluminum, magnesium, yttrium to produce yttrium-aluminum-garnet (YAG), monoclinic YAM, perovskite YAP, magnesium-aluminum-spinel ($MgAl_2O_4$), and magnesia-yttria ($MgO$—$Y_2O_3$). A possible modification involves doping these compositions with additional components made of rare-earth elements to impart additional properties to the existing composite material. This composite material is a multiphase material having a microstructure that can be amorphous with very small grain size less than 5 nm, nanocrystalline with a grain size above 5 nm and below 100 nm, a transitional phase with grain size above 100 nm and below 1 micron, or crystalline with grain size above one micron.

In one particular embodiment, a solution precursor consisting of a stoichiometric composition of water soluble aluminum and yttrium nitrates, distilled or deionized water, citric acid, and ethylene glycol is prepared to produce yttrium-aluminum-garnet oxide ceramic. A typical solution consists of 1250 ml of 0.5 mole solution of $Al(NO_3)_3 \cdot 9H_2O$, 750 ml of 0.5 mole solution of $Y(NO_3)_3 \cdot 6H_2O$, 1798 ml of 0.5 mole solution of citric acid, and 17.77 ml of ethylene glycol. The precursor is thoroughly mixed using a magnetic mixer for at least one hour to insure thorough molecular mixing of composition. It is then injected as uniform droplets, with a unique diameter varying from dozens to 130 micrometers, produced by a high frequency driven piezo-actuated droplet maker at injection flow rates between 1 and 5 milliliters per minute (ml/min). Gas flows not exceeding a total of 80 SCFH for particle entrainment and cooling of the inner wall of the dielectric have been used to stabilize plasma at a relatively low microwave radiation power of 5.5 KW. The YAG powder particles were collected using nylon, ceramic, or stainless-steel filters, encased in an apparatus inserted in the path of the dust collecting and heat evacuation system. The microstructure, size, and morphology are investigated using Scanning Electron Microscopy (SEM), and X-ray Diffraction (XRD) techniques.

Figure 3:
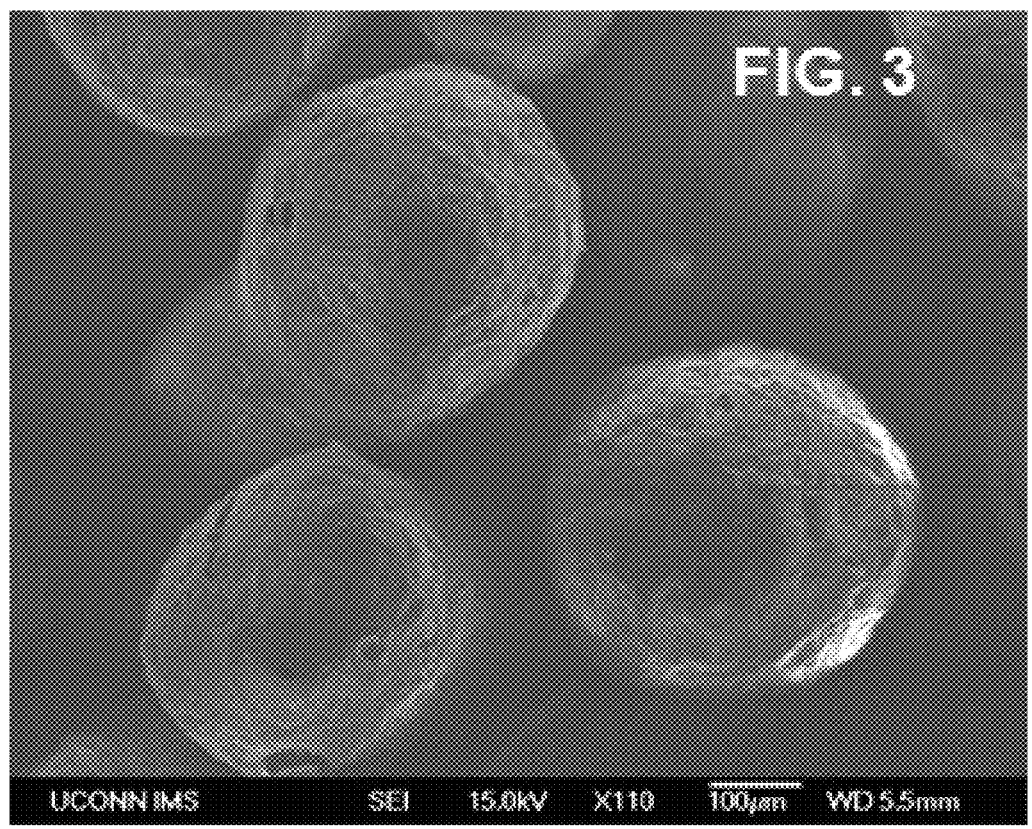
FIG. 3 shows the scanning electron microscopic (SEM) image of yttrium-aluminum-garnet (YAG) particles prepared according to the method of the present disclosure using yttrium and aluminum salts with citric acid and ethylene glycol.

A SEM was used to investigate the size, size distribution, and morphology of amorphous yttrium-aluminum-garnet particles 12 of FIG. 1. Referring to FIG. 3, it can be seen that the resulting YAG particles are nearly spherical, shell-like, with a porous texture at the surface. The diameter varies between 300 to 400 micrometers, or four times the size of the injected precursor droplet. The particles obtained tend to expand and are fluffy due to primarily to the explosive nature of the solvent exhausting during the thermal drying process of the nitrate laden precursor droplet.

Figure 4:
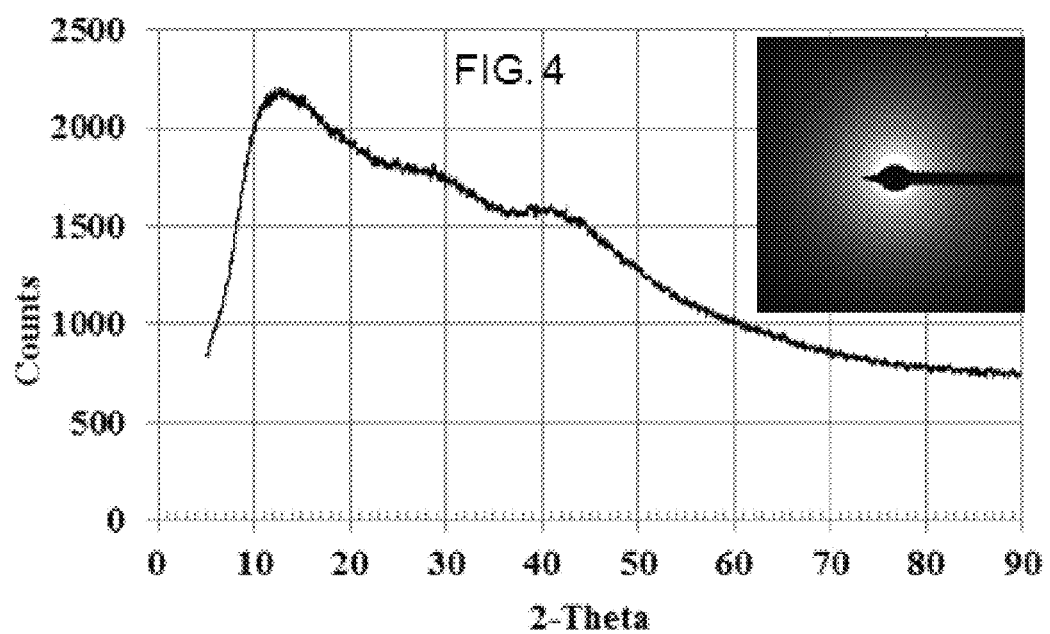
FIG. 4 shows the X-ray diffraction (XRD) pattern and selected area diffraction (SAD) pattern of YAG particles produced according to the method of the present disclosure suggesting an amorphous micro structure.

Referring to FIG. 4, a detailed analysis of the internal microstructure of YAG powder product particle 12 using XRD technique is shown. It reveals that the phase microstructure of the particle product was found to be totally amorphous. This amorphous state denotes the presence of high quenching rates as the processed material exits the plasma hot zone with this particular embodiment.

Figure 5:
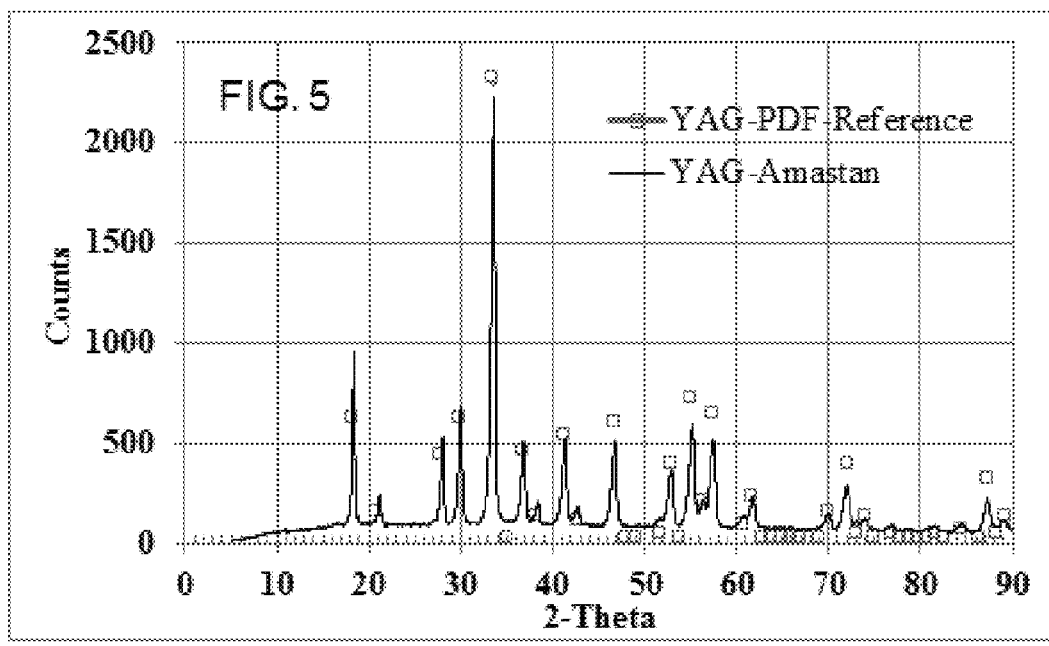
FIG. 5 shows the comparison between XRD pattern of calcined yttrium-aluminum-garnet and XRD powder diffraction file (PDF) reference from database showing phase pure YAG produced according to the method of the present disclosure.

The amorphous product particles were subsequently calcined at 1200 C for one hour, and analyzed using XRD technique. Referring to FIG. 5, the resulting crystalline structure is compared to the crystalline structure of YAG using PDF-33-40 from the XRD database (Reference intensity scaled accordingly for better visual comparison at comparable angles). It can clearly be seen that there is a perfect match between most of the major and small peaks in the XRD plot of the UniMelt-processed and calcined YAG and crystalline YAG used as reference. The perfect alignment of all the peaks denotes the phase purity of the resulting YAG free of any other phases of YAM and YAP in the binary $Y_2O_3$—$Al_2O_3$ oxide system.

In a different embodiment using the apparatus described in FIG. 1, processed particles of metal oxides can be produced with nanocrystalline microstructure using the 1-step thermal process by increasing the residence time of the particle in the hot zone. Such increase of residence time is achieved by increasing the volume of the plasma plume in the dielectric tube housing the microwave plasma. This is performed through the increase of microwave power at the source for generating the plasma. An elongated plasma plume allows full evaporation of solvents, drying of the solutes, melting, and additional sintering of the particle product to achieve nanocrystalline microstructure in-situ before the particles exit the dielectric tube housing the plasma. This allows the additional step of in-situ sintering for crystallization which eliminates the post processing step of sintering amorphous product.

A modification of the composition consisting of yttrium and aluminum elements includes addition of a dopant in amounts of few weight percent of rare earth elements to modify the fundamental properties of the nanocomposite metal oxide YAG. In this case, rare earth salts are added to yttrium and aluminum salts, and solvents which are thermally processed used the microwave plasma. Rare earth elements to be considered include Neodymium (Nd), Erbium (Er), Terbium (Tr), Ytterbium (Yb), Holmium (Ho), and Thulium (Tm). The doping levels range between 0.5 and 3 percent (molar). The nanocomposite YAG powders produced serves as hosting material for laser applications.

In yet another modification of the composition consisting of yttrium and aluminum elements includes addition of a dopant in amounts of few weight percent of another group of rare earth elements to modify the fundamental properties of the nanocomposite metal oxide YAG. Rare earth elements to be considered include Cerium (Ce), Dysprosium (Dy), Samarium (Sm), and Terbium (Tb). This is accomplished by adding the appropriate precursor sources of the rare earth element to the initial aluminum and yttrium solution precursors and injecting into the microwave plasma. Similar doping levels are used, i.e., between 0.5 and 3 percent (molar). The rare-earth doped nanocomposite YAG is suitable to be used as a phosphor.

In another embodiment, a solution precursor consisting of a composition of water soluble aluminum and nickel nitrates, distilled or deionized water, citric acid, and ethylene glycol is prepared to produce nickel-alumina (Ni—$Al_2O_3$) oxide ceramic. A typical solution consists of 22 ml of 0.82 mole solution of $Ni(NO_3)_2 \cdot 7.2H_2O$, 847 ml of 0.82 mole solution of $Al(NO_3)_3 \cdot 9H_2O$, 900 ml of 0.82 mole solution of citric acid, and 14.5 ml of ethylene glycol. Nickel represents 5% molar ratio of the Ni—$Al_2O_3$ composite. Other ratios between 2 to 10% molar can be also considered. The precursor is thoroughly mixed using a magnetic mixer for at least one hour to insure thorough molecular mixing of composition. It is then injected as uniform droplets of dozens to 100 micrometers in diameter produced by a high frequency driven piezo-actuated droplet maker at injection flow rates between 1 and 5 milliliters per minute (ml/mn). Gas flows not lower than 40 SCFH, and not exceeding a total of 120 SCFH for particle entrainment and cooling of the inner wall of the dielectric have been used to stabilize plasma at a relatively low microwave radiation power of 5.5 KW. The nickel-alumina nanocomposites powder particles were collected using nylon, ceramic, or stainless-steel filters, encased in an apparatus inserted in the path of the dust collecting and heat evacuation system.

Other embodiment of compositions can include instead of a nickel salt, other metal salts including platinum, palladium, nickel, silver, gold that are added separately in small amounts to dope an aluminum cation. These compositions are suitable for catalytic applications. Platinum-doped alumina is used in the dehydrogenation of hydrocarbons in the petrochemical industry, whereas palladium- and nickel-doped alumina is used for the hydrogenation of hydrocarbons and fats. Silver-doped alumina is used to transform ethylene to ethylene oxide.

In another embodiment, a solution precursor consisting of a composition of water soluble magnesium and yttrium nitrates, distilled or deionized water, citric acid, and ethylene glycol is prepared to produce magnesium-aluminum-spinel (MgO—$Y_2O_3$) oxide ceramic. A typical solution consists of 1744 ml of 0.5 mole solution of $Mg(NO_3)_2 \cdot 9H_2O$, 218 ml of 0.5 mole solution of $Y(NO_3)_3 \cdot 6H_2O$, 1798 ml of 0.5 mole solution of citric acid, and 17.17 ml of ethylene glycol. The precursor is thoroughly mixed using a magnetic mixer for at least one hour to insure thorough molecular mixing of composition. It is then injected as uniform droplets of dozens to 130 micrometers in unique diameter produced by a high frequency driven piezo-actuated droplet maker at injection flow rates between 1 and 5 milliliters per minute (ml/mn). Gas flows not lower than 40 SCFH, and not exceeding a total of 120 SCFH for particle entrainment and cooling of the inner wall of the dielectric have been used to stabilize plasma at a relatively low microwave radiation power of 5.5 KW. The YAG powder particles were collected using nylon, ceramic, or stainless-steel filters, encased in an apparatus inserted in the path of the dust collecting and heat evacuation system.

Figure 6:
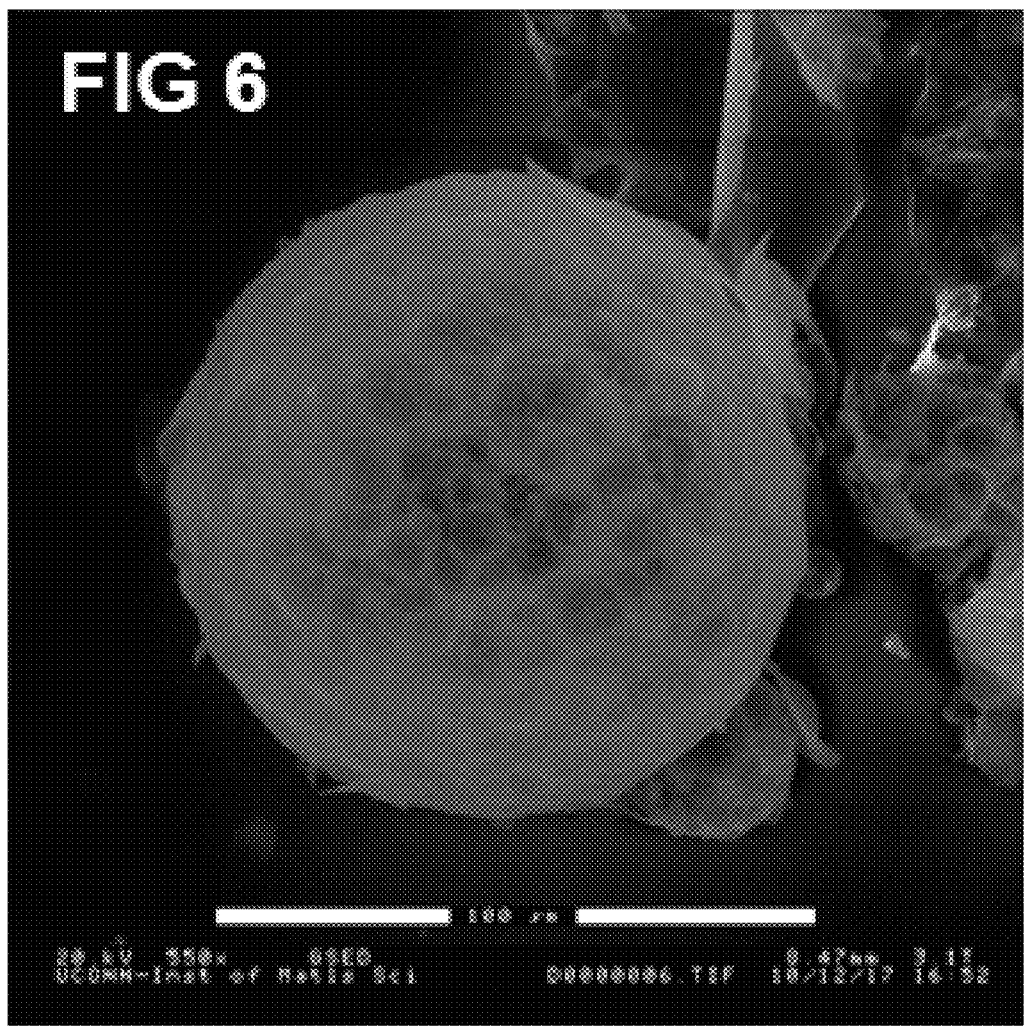
FIG. 6 shows the SEM image of a magnesia-yttrium particle prepared according to the method of the present disclosure using magnesium and yttrium salts with citric acid and ethylene glycol.

A SEM was used to investigate the size, size distribution, and morphology of magnesium-yttrium nanocomposite oxide ceramic particle. Referring to FIG. 6, it can be seen that the resulting MgO—$Y_2O_3$ particles are spherical, shell-like, with a porous and honeycomb-like texture. The average diameter of a typical shell is about 100 micrometers, relatively equal to the diameter of the injected precursor droplet. The particles obtained are fluffy and porous due primarily to the explosive nature of the solvent exhausting during the thermal drying process of the nitrate laden precursor droplet.

The magnesium yttrium oxide ceramic (MgO—$Y_2O_3$) synthesized with the present method can be consolidated using sinter/HIP, hot pressing, and hot press/HIP to produce transparent bodies that are suitable for Infrared transmission. Powders produced with the present method have been found to sinter at lower temperature thus lowering the cost of processing into solid 3D bodies that can be turned into Infra-red domes or windows.

In one particular embodiment, a solution precursor consisting of a stoichiometric composition of water soluble magnesium and aluminum nitrates, distilled or deionized water, citric acid, and ethylene glycol is prepared to produce magnesium-aluminum-spinel ($MgAl_2O_4$) nanocomposite oxide ceramic. A typical solution consists of 1333 ml of 0.5 mole solution of $Al(NO_3)_2 \cdot 9H_2O$, 666 ml of 0.5 mole solution of $Mg(NO_3)_2 \cdot 6H_2O$, 1798 ml of 0.5 mole solution of citric acid, and 17.77 ml of ethylene glycol. The precursor is thoroughly mixed using a magnetic mixer for at least one hour to insure thorough molecular mixing of composition. It is then injected as uniform droplets of dozens to 130 micrometers in unique diameter produced by a high frequency driven piezo-actuated droplet maker at injection flow rates between 1 and 5 milliliters per minute (ml/mn). Gas flows not lower than 40 SCFH, and not exceeding a total of 120 SCFH for particle entrainment and cooling of the inner wall of the dielectric have been used to stabilize plasma at a relatively low microwave radiation power of 5.5 KW. The $MgAl_2O_4$ nanocomposite spinel powder particles were collected using nylon, ceramic, or stainless-steel filters, encased in an apparatus inserted in the path of the dust collecting and heat evacuation system.

Figure 7:
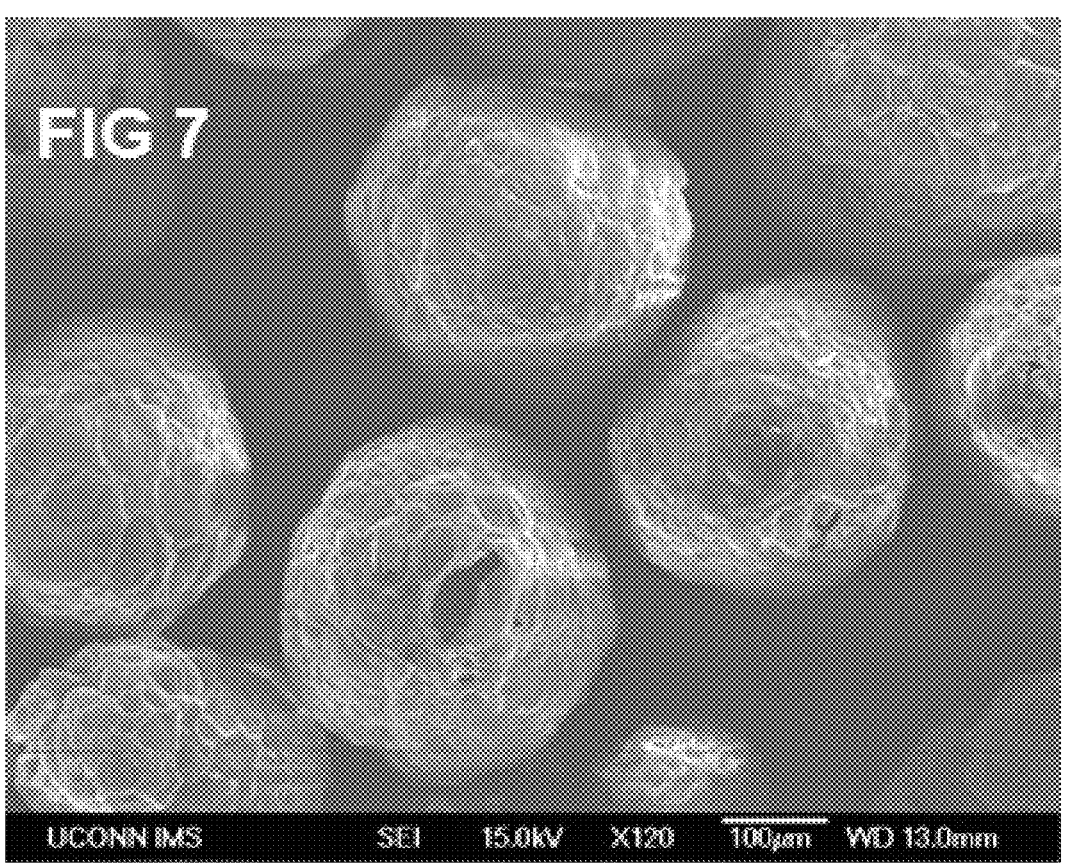
FIG. 7 shows the SEM image of spinel particles prepared according to the method of the present disclosure using magnesium and aluminum salts with citric acid and ethylene glycol.

A SEM was used to investigate the size, size distribution, and morphology of magnesium-aluminum nanocomposite spinel oxide ceramic. Referring to FIG. 7, it can be seen that the resulting $MgAl_2O_4$ particles are nearly spherical, shell-like, with a porous texture at the surface. The average diameter of a typical shell is about 300 micrometers, or three times the diameter of the injected precursor droplet. The particles obtained tend to expand and are fluffy due to primarily to the explosive nature of the solvent exhausting during the thermal drying process of the nitrate laden precursor droplet.

The magnesium aluminate spinel ($MgAl_2O_4$) synthesized with the present method can be consolidated using sinter/HIP, hot pressing, and hot press/HIP to produce transparent bodies that are suitable for visible-to-infrared transmission, or as a transparent armor. Powder produced with the present method have been found to sinter at lower temperature thus lowering the cost of processing into solid 3D bodies that can be turned into domes, or transparent armor plates.

In one particular embodiment, a solution precursor consisting of a stoichiometric composition of water soluble lanthanum, magnesium nitrates or acetates, and aluminum nitrates, distilled or deionized water is prepared to produce lanthanum-magnesium-hexaaluminate ($LaMgAl_{11}O_{19}$) nanocomposite oxide ceramic powder. A typical solution consists of 676.4 ml of water with 100 grams $Al(NO_3)_2 \cdot 9H_2O$, 61.50 ml with 8.31 grams of magnesium acetate, and 61.70 ml of water with 5.20 grams of lanthanum acetate, The precursor is thoroughly mixed using a magnetic mixer for at least one hour to insure thorough molecular mixing of composition. It is then injected as uniform droplets of dozens to 130 micrometers in unique diameter produced by a high frequency driven piezo-actuated droplet maker at injection flow rates between 1 and 5 milliliters per minute (ml/mn). Gas flows not lower than 40 SCFH, and not exceeding a total of 120 SCFH for particle entrainment and cooling of the inner wall of the dielectric have been used to stabilize plasma at a relatively low microwave radiation power of 5.5 KW. The $LaMgAl_{11}O_{19}$ nanocomposite powder particles are collected using ceramic, or stainless-steel filters, encased in an apparatus inserted in the path of the dust collecting and heat evacuation system. These $LaMgAl_{11}O_{19}$ nanocomposite powders are suitable for thermal barrier coatings or catalyst applications.

Figure 8:
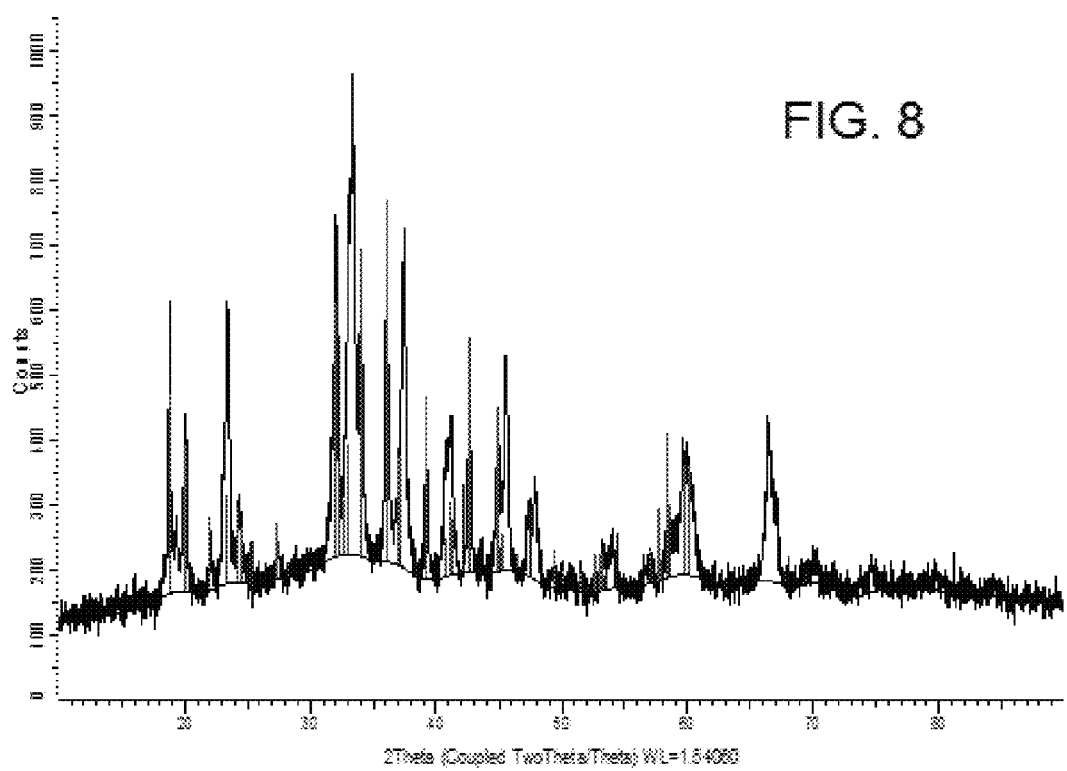
FIG. 8 shows the XRD pattern of lanthanum-magnesium-hexaaluminate product particles quenched onto a heated substrate showing nanocomposite phase microstructure produced according to the method of the present disclosure.

Referring to FIG. 8, a detailed analysis of the internal microstructure of $LaMgAl_{11}O_{19}$ using XRD technique is shown. This figure illustrates the result of quenching into a different environment other than ambient atmosphere. Indeed, the particle product after UniMelt processing is quenched into a heated substrate (typical temperature ~450° C.). This results in a lower quenching rate compared to quenching into ambient atmosphere. As a result, the XRD spectrum shown in FIG. 8 is defined by a series of sharp peaks (black curve) indicating the existence of a nanocomposite phase microstructure for the lanthanum-magnesium-aluminum oxide.

In one particular embodiment, a solution precursor consisting of a stoichiometric composition of water soluble zyrconyl and yttrium nitrates, distilled or deionized water, citric acid, and ethylene glycol is prepared to produce 8-weight % yttria stabilized zirconia (8YSZ) nanocomposite oxide ceramic powder. A typical solution consists of 251.24 ml of water with 50.24 grams zyrconyl nitrate hydrate, 23.84 ml with 7.32 grams of yttrium nitrate, 251.24 ml of water with 38.72 grams of citric acid, and 3.78 ml of ethylene glycol. The precursor solution is thoroughly mixed using a magnetic mixer for at least one hour to insure thorough molecular mixing of composition. It is then injected as uniform droplets of dozens to 130 micrometers in unique diameter produced by a high frequency driven piezo-actuated droplet maker at injection flow rates between 1 and 5 milliliters per minute (ml/mn). Gas flows not lower than 40 SCFH, and not exceeding a total of 120 SCFH for particle entrainment and cooling of the inner wall of the dielectric have been used to stabilize plasma at a relatively low microwave radiation power of 5.5 KW. The 8YSZ nanocomposite powder particles are collected using ceramic, or stainless-steel filters, encased in an apparatus inserted in the path of the dust collecting and heat evacuation system. These 8YSZ nanocomposite powders are suitable as electrolytes for solid oxide fuel cell (SOFC) applications.

In one particular embodiment, a solution precursor consisting of a stoichiometric composition of water soluble magnesium and aluminum nitrates or acetates, and distilled or deionized water is prepared and then injected into a nitrogen microwave plasma gas to produce magnesium-aluminum-oxynitride (MgALON) nanocomposite oxide ceramic powder. The precursor solution is thoroughly mixed using a magnetic mixer for at least one hour to insure thorough molecular mixing of composition. It is then injected as uniform droplets of dozens to 130 micrometers in unique diameter produced by a high frequency driven piezo-actuated droplet maker at injection flow rates between 1 and 5 milliliters per minute (ml/mn). Gas flows consisting of nitrogen not lower than 40 SCFH, and not exceeding a total of 120 SCFH for particle entrainment and cooling of the inner wall of the dielectric are used to stabilize plasma at a relatively low microwave radiation power of 5.5 KW. The MgALON nanocomposite powder particles are collected using ceramic, or stainless-steel filters, encased in an apparatus inserted in the path of the dust collecting and heat evacuation system. These MgALON nanocomposite powders are suitable for transparent armor applications.

Figure 9:
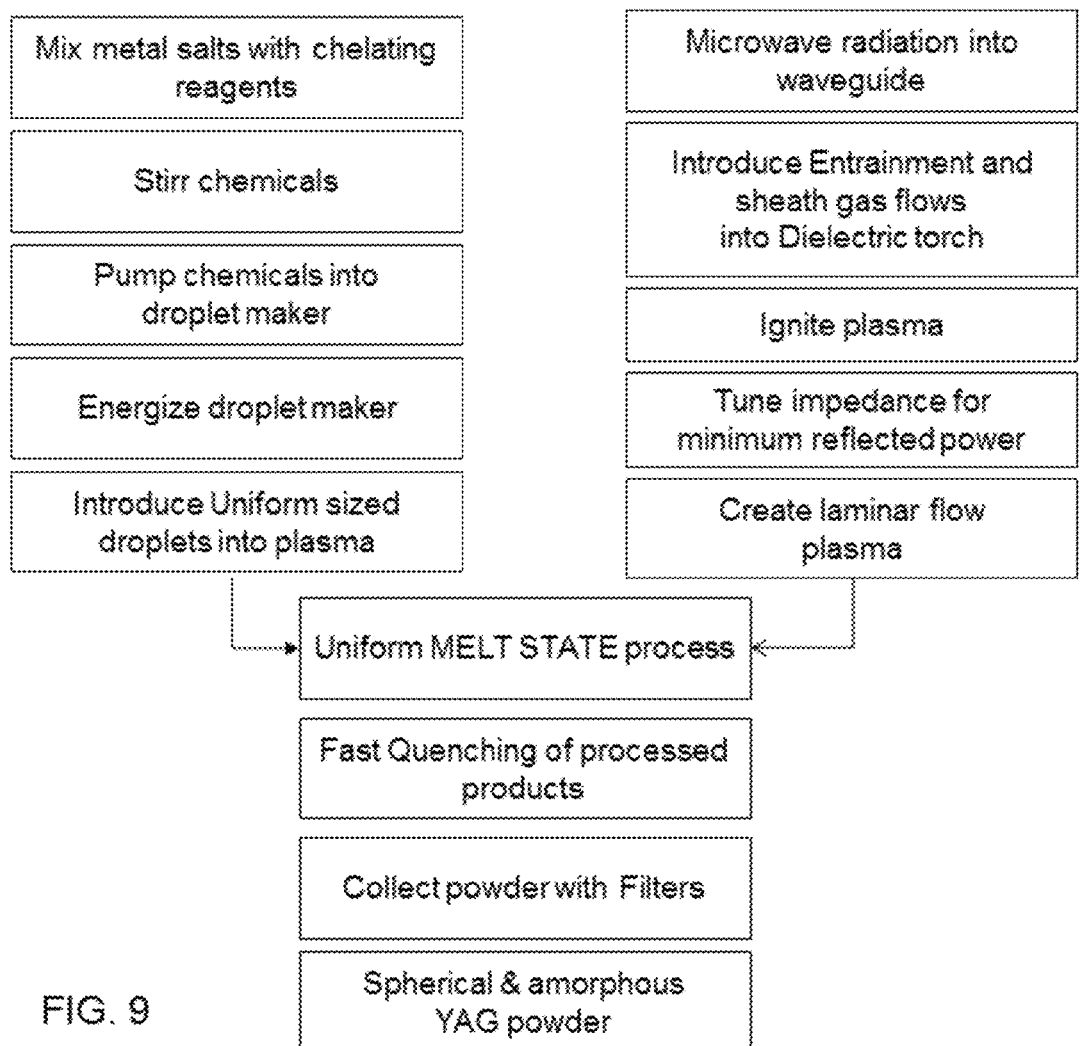
FIG. 9 illustrates the flow chart of one embodiment according to the method of the present disclosure, the precursor metal salts mixed with reagents and the accompanying heat treatment by microwave plasma.

Referring to FIG. 9, the amorphous or nanocrystalline metal oxide particles are made using uniform solution droplets according to the procedure described therein. The desired chemical composition is first mixed according to the assigned proportions of reactants. It is subsequently thoroughly stirred to yield a homogenous molecular mix of reactants. The solution is then pumped inside a reservoir of a droplet maker using a peristaltic pump, or a pressurized tank. Once the reservoir is full, a piezo transducer is activated using high frequency drive electronics to impinge the adequate perturbation into the rigid ceiling, or membrane, of the solution reservoir. This in turns creates a disturbance in the volume of solution in the reservoir. When the perturbation satisfies Rayleigh's breakdown law, the solution emerges through a capillary nozzle as a continuous stream of uniform droplets exiting at a constant speed for a given frequency of the electronics drive. Special attention is afforded to the nature of the droplets stream so that it is not in a burst mode, but instead it is in the form of a jet with uniform droplets. Prior to this, and referring to the right side of FIG. 9, a microwave radiation is introduced into the waveguide towards the plasma chamber where the dielectric plasma torch is located, and placed perpendicularly to the waveguide. Two annular flows are introduced: one for entrainment of injected droplets; the other flow to protect the inner wall of the outer tube of the plasma torch from melting under the effect of high heat from plasma. Once both flows are in place, the plasma is ignited inside the dielectric plasma torch. Adequate combination of entrainment and cooling flows are chosen to stabilize the plasma. Also, these flows are chosen so as to allow smooth circulation of droplets towards the plasma and avoid turbulence that could create recirculation and back flow of droplets above the hot zone. Once the droplets reach the plasma now present in the hot zone, they are subjected to a uniform MELT STATE characterized by a uniform thermal path along with uniform temperature profile of the plasma in the hot zone. The droplets are processed volumetrically and uniformly as all solvents are burned off. The processed particles exit into a controlled atmospheric quenching chamber below the exit nozzle of the plasma. The particle product are collected in nylon, ceramic, or stainless steel filters and analyzed for its microstructure and its mechanical, optical, and thermal properties.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:
1. A method of making particles using a microwave generated plasma comprising:
   a. preparing a salt solution in water, in organic solvent, or in a mixture of water and organic solvent;
   b. generating precursor droplets from said salt solution using a feed injection device;
   c. introducing axially said precursor droplets into a microwave plasma torch;

d. entraining said precursor droplets using at least two concentric laminar gas flows towards a microwave generated plasma;
e. exposing said precursor droplets to high temperature within said microwave generated plasma;
f. controlling residence time of said precursor droplets in said microwave generated plasma;
g. controlling quenching rates of an exhaust gas of said microwave generated plasma in a gas chamber;
h. filtering the exhaust gas of said microwave generated plasma; and
i. extracting particles from said exhaust gas.

2. The method of claim 1, wherein said step of preparing a salt solution is prepared by further adding an acid to water, organic solvent, or to a mixture of water and organic solvent.

3. The method of claim 1, wherein said step of preparing a salt solution is prepared by combining at least a first solution and a second solution.

4. The method of claim 3, further comprising preparing said first solution by:
mixing water and organic solvent;
adding an acid to water; or
adding an acid to a mixture of water and organic solvent.

5. The method of claim 3, further comprising preparing said second solution by:
dissolving at least one salt in water; or
dissolving at least one salt in mixture of water and organic solvent.

6. The method of claim 3, further comprising preparing said first solution by:
mixing water and ethylene glycol;
adding citric acid to water; or
adding citric acid to a mixture of water and ethylene glycol.

7. The method of claim 1, wherein said step of preparing a salt solution is prepared in a mixture of water and organic solvent and further selecting the organic solvent from the group consisting of ethanol, methanol, 1-propanol, 2-propanol, tetrahydrofuran, and a combination thereof.

8. The method of claim 1, wherein said salt solution includes a salt selected from the group consisting of cations of lithium, sodium, potassium, rubidium, magnesium, calcium, strontium, barium, scandium, yttrium, titanium, vanadium, chromium, manganese, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold, aluminum, gallium, indium, tin, thallium, lead, bismuth, lanthanum, cerium, praseodymium, neodymium, promethium, samarium, europium, gadolinium, terbium, dysprosium, holmium, erbium, thulium, ytterbium, lutetium, thorium, boron, silicon, germanium, arsenic, antimony, tellurium, carbon, phosphorus, sulfur, selenium, and combinations thereof.

9. The method of claim 1, wherein said step of preparing a salt solution comprises dissolving salts comprising cations of:
aluminum;
yttrium, scandium, or combinations thereof; and
dopants selected from the group consisting of lanthanum, cerium, praseodymium, neodymium, promethium, samarium, europium, gadolinium, terbium, dysprosium, holmium, erbium, thulium, ytterbium, lutetium, and a combination thereof.

10. The method of claim 1, wherein said step of preparing a salt solution comprises dissolving salts comprising cations of:
aluminum, zirconium, silicon, magnesium, and manganese, or combinations thereof; and
doping transition metals selected from the group consisting of palladium, platinum, nickel, silver, gold, ruthenium, rhodium, vanadium, molybdenum, cobalt, tungsten, and any combination thereof.

11. The method of claim 1, wherein said step of preparing a salt solution comprises dissolving salts comprising cations of magnesium and yttrium.

12. The method of claim 1, wherein said step of preparing a salt solution comprises dissolving salts comprising cations of magnesium and aluminum.

13. The method of claim 1, wherein said step of preparing a salt solution comprises dissolving salts comprising cations of lanthanum; magnesium; and aluminum.

14. The method of claim 1, wherein said step of preparing a salt solution comprises dissolving salts comprising cations of:
zirconium; and
yttrium or samarium.

15. The method of claim 1, wherein said step of preparing a salt solution comprises dissolving salts selected from the group consisting of nitrate, acetate, citrate, sulfate, carbonate, chloride, phosphate, alkoxide, atrane, tetraethyl, orthosilicate, metallic borohydride, and a combination thereof.

16. The method of claim 1, wherein said at least two concentric laminar flows comprise flows of gas selected from the group consisting of air, oxygen, argon, methane, ammonia, nitrogen, and a combination thereof.

17. The method of claim 1, wherein said step of controlling quenching rates is further adjusted by selecting a rate no less than $10^3$ Kelvin per second (K/s) to no more than $10^6$ K/s.

18. The method of claim 17, wherein controlling quenching rates comprises controlling quenching rates of an exhaust gas of said microwave generated plasma in a gas chamber with controllable atmosphere.

* * * * *